United States Patent [19]

Komiya

[11] Patent Number: 5,172,982

[45] Date of Patent: Dec. 22, 1992

[54] LINEAR MOTION ROLLING GUIDE UNIT

[75] Inventor: Yoshiyuki Komiya, Kawasaki, Japan

[73] Assignee: Nippon Thompson Co., Ltd., Tokyo, Japan

[21] Appl. No.: 749,720

[22] Filed: Aug. 26, 1991

[30] Foreign Application Priority Data

Aug. 27, 1990 [JP] Japan .................................. 2-88404

[51] Int. Cl.$^5$ ............................................. F16C 29/06
[52] U.S. Cl. ...................................................... 384/45
[58] Field of Search ............................ 384/45, 44, 43; 464/168

[56] References Cited

U.S. PATENT DOCUMENTS

| | | | |
|---|---|---|---|
| 4,773,770 | 9/1988 | Osawa et al. | 384/45 |
| 4,953,988 | 9/1990 | Tsukada | 384/45 |
| 4,988,215 | 1/1991 | Osawa | 384/45 |
| 5,011,300 | 4/1991 | Teramachi | 384/45 |

Primary Examiner—Lenard A. Footland
Attorney, Agent, or Firm—Rogers & Killeen

[57] ABSTRACT

A linear motion rolling guide unit comprising a track rail of substantially rectangularly columnar shape and a slider slidably movable on said track rail, said track rail being formed with arcuate raceway grooves at both right and left shoulders of sidewall surfaces thereof, said slider being formed with an arcuate raceway groove on an inner peripheral surface thereof opposed to the arcuate raceway grooves of said track rail, balls being arranged between said arcuate raceway grooves. Said track rail has bottom mounting portions, relieves are formed longitudinally at both sides of the bottom mounting portions, a relief groove is longitudinally at an axially central position of the track rail so that the width of bottom mounting portions thereof interposed between relieves is smaller than the diameter of the mounting hole of said track rail so as to improve its moving accuracy while maintaining a parallelism between the track rail and an opponent member.

2 Claims, 4 Drawing Sheets $H_o > D_o$

LINEAR MOTION ROLLING GUIDE UNIT

BACKGROUND OF THE INVENTION

The present invention relates to improvements in a track rail of a linear motion rolling guide unit for linearly rolling to guide a slider with balls therebetween, in which the track rail is a substantially rectangular columnar and is formed with an arcuate raceway groove partly on the longitudinal wall surface thereof and the slider has a substantially U shaped section with angles and is formed with an arcuate raceway groove on an inner peripheral surface thereof opposed to the raceway groove of said track rail.

Heretofore, a track rail of a conventional linear motion rolling guide unit of this type as shown in FIG. 6 has been known.

The conventional track rail shown in FIG. 6 has an upper flat surface 10 and a bottom mounting portion 11 formed in parallel with one another. Load ball grooves 12 and 13 are formed at predetermined positions for supporting and guiding a slider with balls. The track rail has lower side surfaces 14 and 15 formed perpendicularly to the bottom thereof. A relieved groove 16 is formed axially at a predetermined position of the bottom mounting portion 11. The track rail is formed with a mounting hole 17 passing through the upper flat surface 10 and the bottom mounting portion 11. The relieved groove 16 formed at the bottom mounting portion 11 of the track rail reduces an area of grinding to decrease a machining cost thereof and to facilitate the formation of a right angle at both side surfaces at the time of mounting.

However, the track rail of the conventional linear motion rolling guide unit has the following disadvantages.

First, when the conventional track rail is clamped at predetermined positions of a bed of a machine tool with bolts, since the diameter $D_0$ of the mounting hole is smaller than the size $H_0$ of the mounting portion, the portion completely clamped at the opposed mounting surface and the portion incompletely clamped thereat occur according to the clamping degrees of the bolts, and the track rail cannot be mounted in parallel with the bed.

Second, when the clamping forces of the bolts are increased in the conventional track rail, a difference of clamping forces of the bolts occurs according to the elongating degree of the bolts and the bending degree of the track rail, and the track rail cannot be mounted in parallel with the bed.

SUMMARY OF THE INVENTION

This invention contemplates to eliminate the disadvantages of the prior art, and an object of this device is to provide a linear motion rolling guide unit capable of reliably clamping a track rail and improving its moving accuracy while maintaining a parallelism between the track rail and an opponent member even if the clamping forces of bolts are increased when the track rail is mounted in a bed or the like.

A linear motion rolling guide unit according to this invention comprises a track rail of substantially rectangularly columnar shape and a slider slidably movable on said track rail, said track rail being formed with arcuate raceway grooves at both right and left shoulders of sidewall surfaces thereof, said slider being formed with an arcuate raceway groove on an inner peripheral surface thereof opposed to the arcuate raceway grooves of said track rail, balls being arranged between said arcuate raceway grooves, wherein said track rail has bottom mounting portions, relieves are formed longitudinally at both sides of the bottom mounting portions, a relief groove is longitudinally at an axially central position of the track rail so that the width of bottom mounting portions thereof interposed between relieves is smaller than the diameter of the mounting hole of said track rail.

PREFERRED EMBODIMENT

An embodiment of this device will be described in detail with reference to the drawings.

Figure 1:
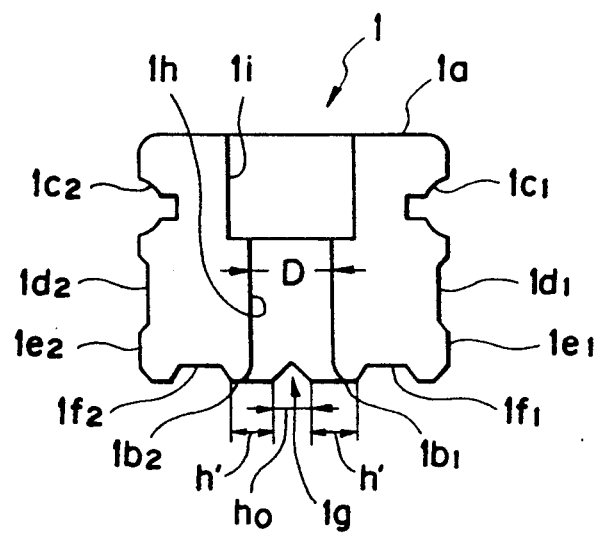
FIG. 1 is a longitudinal sectional front view showing an embodiment of a track rail of a linear motion rolling guide unit according to this invention.
Figure 2:
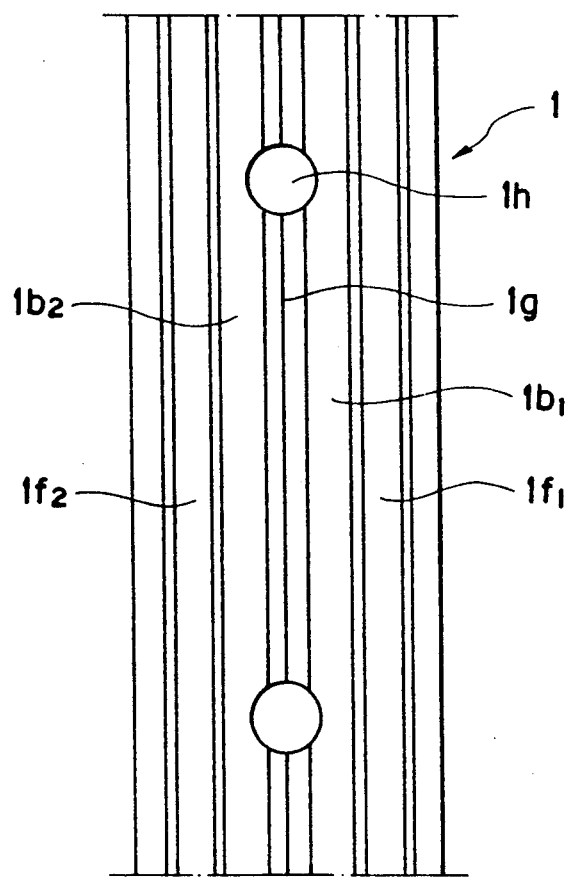
FIG. 2 is a bottom view of FIG. 1.

In FIG. 1, a track rail 1 is applied to a linear motion rolling guide unit according to this invention. The track rail 1 has an upper flat surface $1a$ formed longitudinally, bottom mounting portions $1b_1$ and $1b_2$ having surfaces parallel to the upper flat surface $1a$, arcuate raceway grooves $1c_1$ and $1c_2$ formed on both sides surfaces in the vicinity of shoulder portions at both sides of the track rail 1, and side recesses $1d_1$ and $1d_2$ and side surfaces $1e_1$ and $1e_2$ formed perpendicularly to the bottom surface at the lower portion of the raceway grooves $1c_1$ and $1c_2$. A recess $1i$ having a predetermined diameter is formed at the center of the track rail 1, and mounting holes $1h$ for coupling the track rail 1 from the recess $1i$ to a bed (not shown) by screws are formed. The mounting hole $1h$ has a diameter D. A relief groove $1g$ of substantially triangular-shaped section is formed longitudinally of the track rail 1 between the bottom mounting portions $1b_1$ and $1b_2$ of the track rail 1. Relieves $1f_1$ and $1f_2$ are formed at both sides of the bottom mounting portions $1b_1$ and $1b_2$. The relief groove $1g$ of substantially triangular-shaped section is adapted to eliminate loss of its rigidity to facilitate machining thereof. The relieves $1f_1$ and $1f_2$ reduce areas of grinding to decrease machining costs and facilitate formation of right angles at both sides at the time of mounting.

The relives $1f_1$ and $1f_2$ are formed in widths substantially equal to or smaller than the diameter D of the mounting hole $1h$ of the track rail 1. Therefore, the width $h_0$ of the relief groove $1g$ is determined so as to narrow the widths $h'$ of the bottom mounting portions $1b_1$ and $1b_2$ from the diameter D of the mounting hole $1h$. The relief groove $1g$ is formed at the axial center to eliminate loss of the rigidity of the track rail 1 and to form the widths $h'$ of the bottom mounting portions $1b_1$ and $1b_2$ smaller than the diameter D of the mounting hole $1h$ by a simple machining. Therefore, the contact surface pressure of the track rail 1 with the bed on which the track rail 1 is mounted per unit area is increased to be clamped with a complete flatness. Further, the bottom mounting portions $1b_1$ and $1b_2$ are arranged symmetrically with respect to its lateral direction. Thus, even if the clamping force of a bolt varies, the track rail 1 can be clamped in good balance with flatness without difference of bending degree of the track rail 1. Therefore, when the track rail 1 is mounted at predetermined positions of the bed with bolts, the track rail can be clamped in parallel. Even if the clamping forces of the bolts are increased, no difference occurs between the elongating degrees of the bolts and the bending degree of the track rail, but the track rail can be clamped in parallel, thereby improving the moving accuracy of the slide base.

An embodiment of the track rail 1 applied to a linear motion rolling guide unit will be described with reference to FIGS. 3 to 5.

Figure 3:
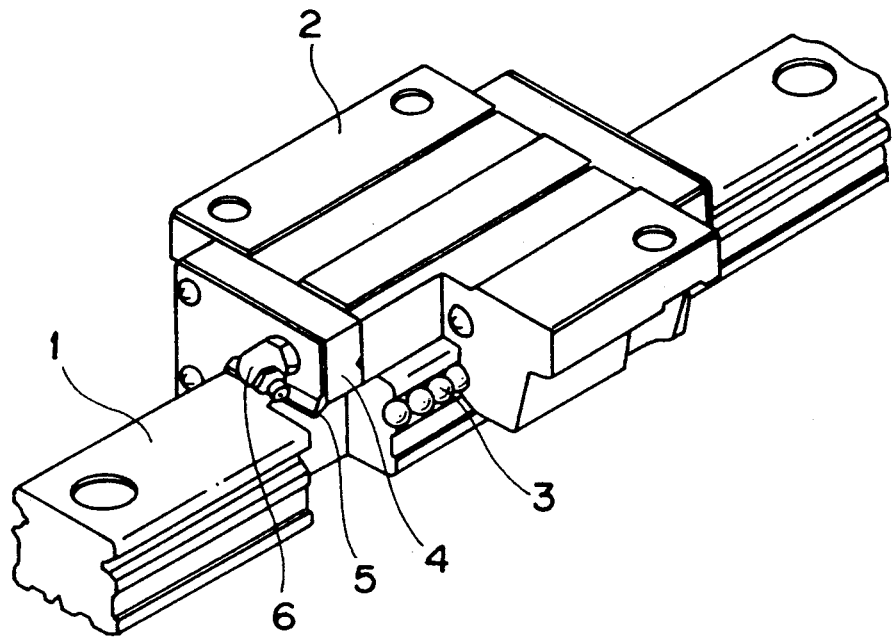
FIG. 3 is a perspective view of a linear motion rolling guide unit according to this invention.

In FIG. 3, the linear motion rolling guide unit comprises a track rail 1 and a slider 2 attached over the track rail 1 with balls 3. The slider 2 are linearly rolled on and guided by the track rail 1 with the balls 3. The slider 2 has arcuate raceway grooves (not shown) on an inner peripheral wall thereof opposed to the arcuate raceway grooves $1c_1$ and $1c_2$ of the track rail 1 in FIG. 1. A side plate 4 of the slider 2 has a conversion passage of the balls 3 therein. A side surface seal 5 is provided on an end surface of the side plate 4 to prevent leakage of oil and invasion of dusts between the slider 2 and the peripheral surface of the track rail 1. Numeral 6 indicates grease nipple for supplying grease.

Figure 4:
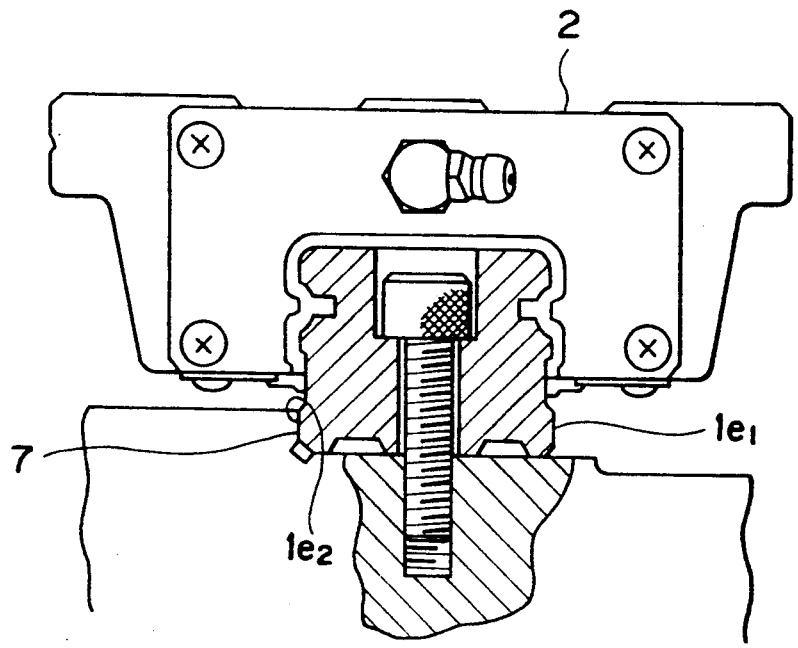
FIG. 4 is a view as seen from the front of FIG. 3.
Figure 5:
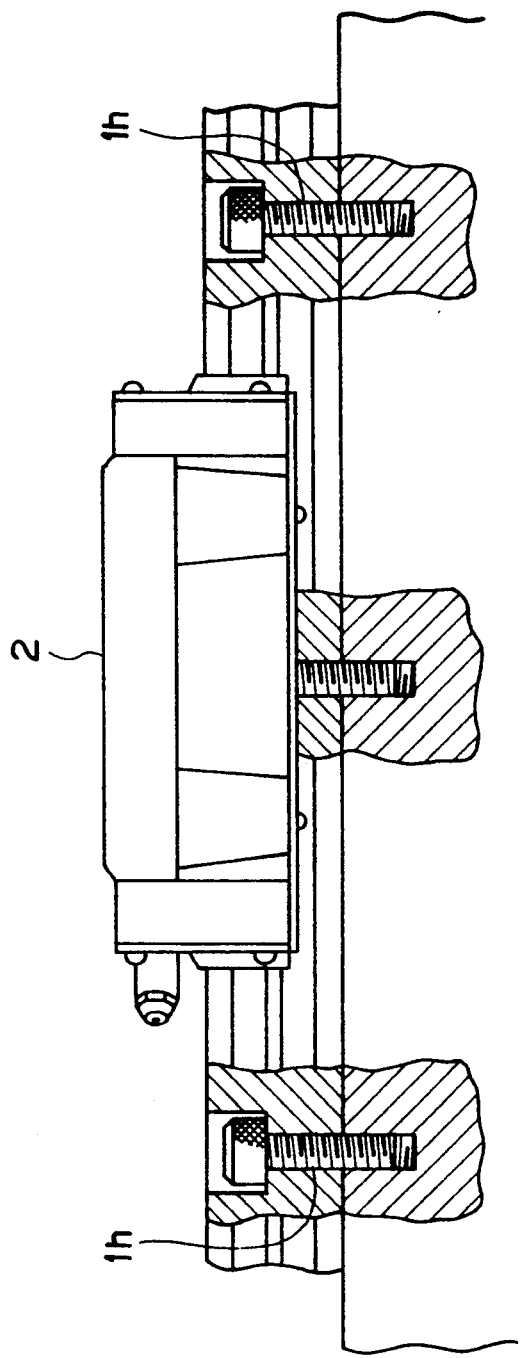
FIG. 5 is a view as seen from the side of FIG. 3.
Figure 6:
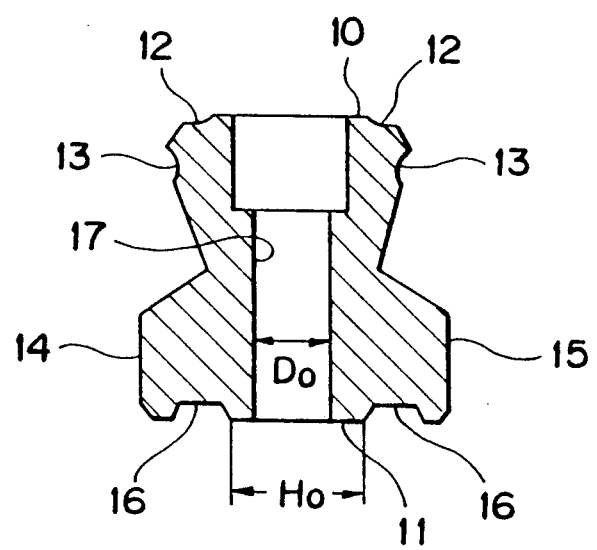
FIG. 6 is a longitudinal sectional front view showing a prior art.

When the linear motion rolling guide unit constructed as described above is mounted on a bed of a machine tool or the like, as shown in FIG. 4, the side surface $1e_2$ ($1e_1$) of the track rail 1 and a reference surface 7 of the bed are reference-matched and secured fixedly. The track rail 1 is clamped on the bed with bolts at the mounting holes $1h$ formed at a predetermined interval as shown in FIG. 5. In this case, since the widths h' of the bottom mounting portions $1b_1$ and $1b_2$ of the mounting surfaces of the track rail 1 according to the invention are formed smaller than the diameter D of the mounting hole $1h$, the surface pressure to the bed per unit area is raised. Further, since the bottom mounting portions $1b_1$ and $1b_2$ are arranged symmetrically at both sides of the relief groove $1g$, the track rail can be assuredly clamped on the bed with flatness to the contact surface of the bed, even if the pressure forces of the bolts are increased.

According to the invention as described above, the following advantages are provided.

(1) Since the relief groove of substantially triangular-shaped section is formed at the axial center of the bottom of the track rail according to the invention, the rigidity of the track rail is not lost, and the widths of the bottom mounting portions can be formed smaller than the diameter of the mounting hole by a simple machining.

(2) Since the contact surface pressure of the opponent member such as the bed to be mounted with the track rail per unit area can be increased, the track rail can be clamped with complete flatness according to the invention.

(3) Since the bottom mounting portions of the bottom of the track rail are arranged laterally at symmetrical positions, even if the clamping forces of the bolts vary, the track rail can be clamped in balance with flatness without difference of the bending degree of the track rail. Therefore, when the track rail is mounted with bolts at predetermined positions on the bed, it can be clamped in parallel. Further, even if the clamping forces of the bolts are increased, it can be mounted in parallel without difference between the elongating degrees of the bolts and the bending degree of the track rail, thereby improving the traveling accuracy of the track rail.

What is claimed is:

1. A linear motion rolling guide unit comprising a track rail of substantially rectangularly columnar shape and a slider slidably movable on said track rail, said track rail being formed with arcuate raceway grooves at both right and left shoulders of sidewall surfaces thereof, said slider being formed with an arcuate raceway groove on an inner peripheral surface thereof opposed to the arcuate raceway grooves of said track rail, balls being arranged between said arcuate raceway grooves, wherein said track rail has bottom mounting portions, relieves are formed longitudinally at both sides of the bottom mounting portions, a relief groove is longitudinally at an axially central position of the track rail so that the width of bottom mounting portions thereof interposed between relieves is smaller than the diameter of the mounting hole of said track rail.

2. The linear motion rolling guide unit according to claim 1, wherein said relief groove is formed substantially in a triangular-shaped section.

* * * * *